Figure 1:
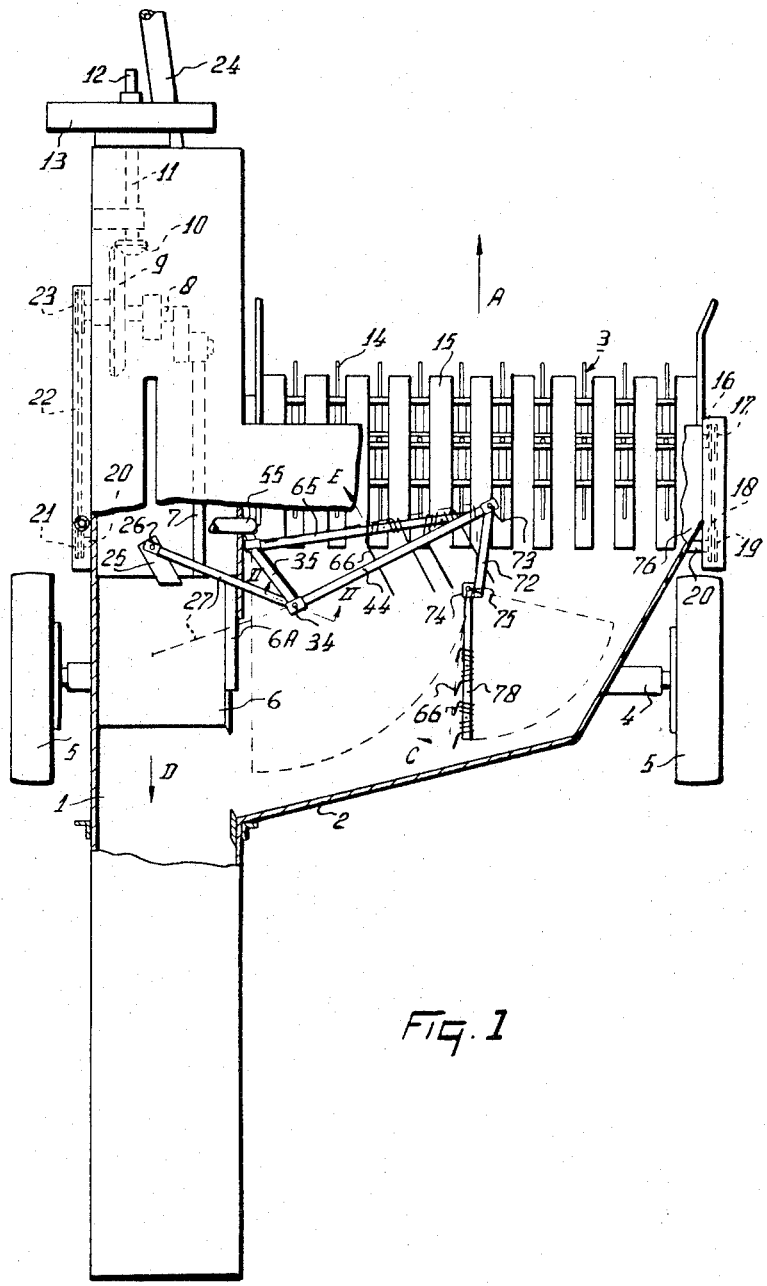

Sept. 27, 1966   C. VAN DER LELY   3,274,926
BALING MACHINES
Filed June 26, 1964   3 Sheets-Sheet 1

INVENTOR.
CORNELIS VAN DER LELY
BY
Mason, Mason & Albright
Attorneys

Sept. 27, 1966 C. VAN DER LELY 3,274,926
BALING MACHINES
Filed June 26, 1964 3 Sheets-Sheet 2
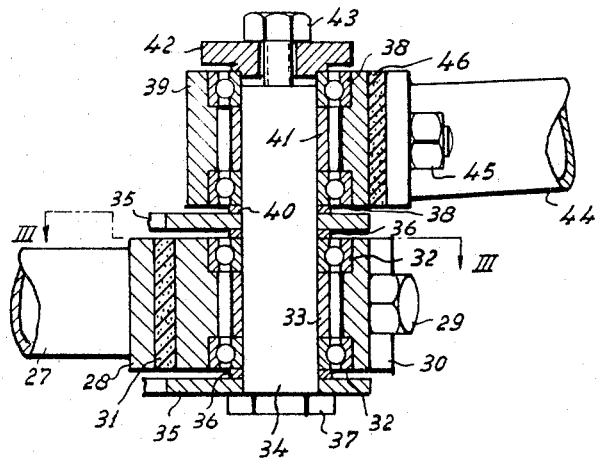
FIG. 2
FIG. 3
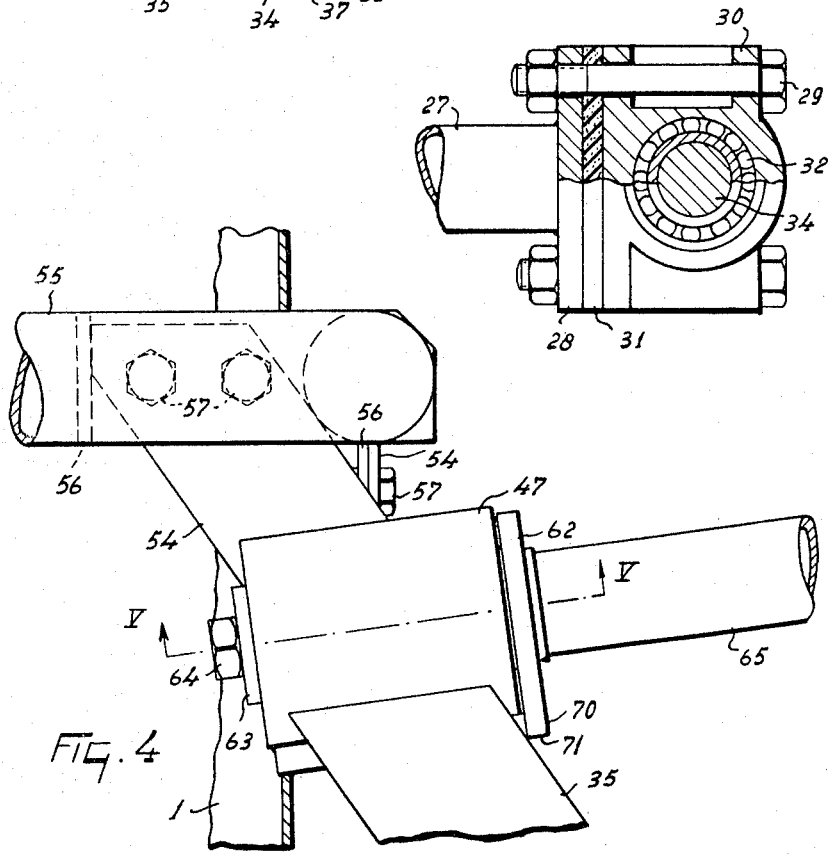
FIG. 4
INVENTOR.
CORNELIS VAN DER LELY
BY
Mason, Mason & Albright
Attorneys

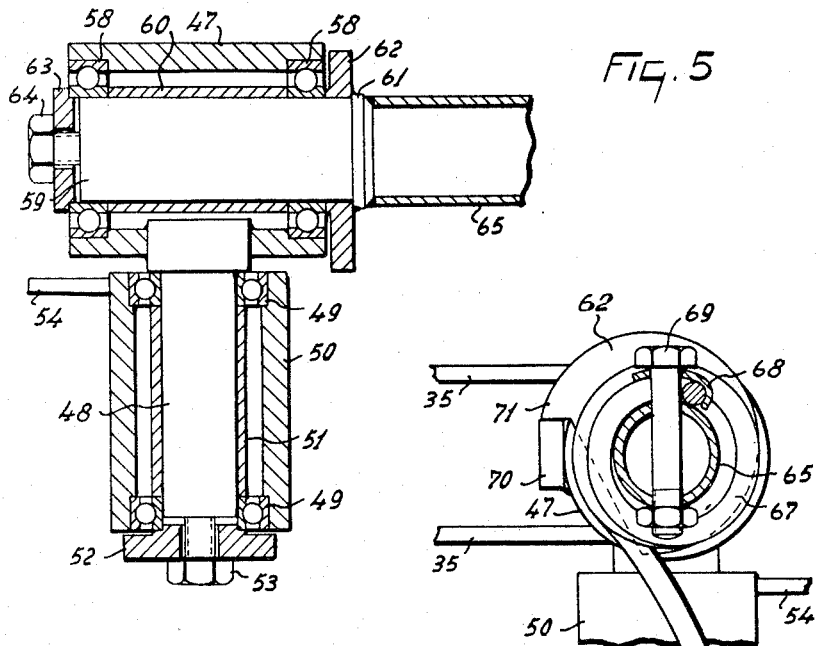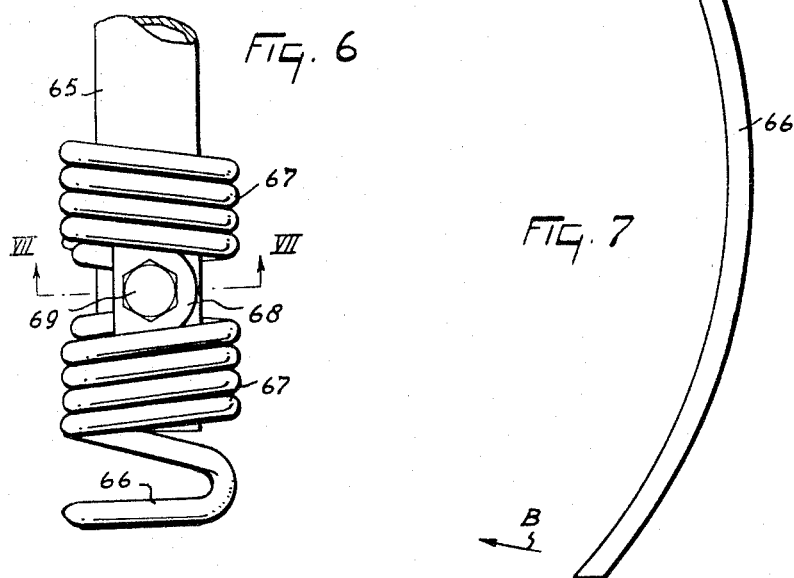

United States Patent Office 3,274,926
Patented Sept. 27, 1966

3,274,926
BALING MACHINES
Cornelis van der Lely, Zug, Switzerland, assignor to Patent Concern N.V., Willemstad, Curacao, Netherlands Antilles, a limited-liability company of the Netherlands Antilles
Filed June 26, 1964, Ser. No. 378,269
Claims priority, application Netherlands, July 1, 1963, 294,796
13 Claims. (Cl. 100—188)

This invention relates to baling machines of the kind comprising a baling chamber, a co-operating compression member and a feeding device adapted to supply crop for baling to the baling chamber.

An object of the invention is to improve the feeding device in such a way that the baling machine can have a relatively large working width whilst retaining a generally simple, effective and light construction.

According to the invention, there is provided a baling machine of the kind set forth, wherein the feeding device includes two co-operating arms each mounted so as to be turnable about a corresponding veritcal or substantially vertical axis and each carrying members adapted to engage and displace crop.

For a better understanding of the invention, and to show how the same may be carried into effect, reference will now be made, by way of example, to the accompanying drawings, in which:

FIGURE 1 is a part-sectional plan view of a ram-type pick-up baler in accordance with the invention, FIGURE 2 is a section, to an enlarged scale, taken on the line II—II of FIGURE 1, FIGURE 3 is a section taken on the line III—III of FIGURE 2, FIGURE 4 is a segmental plan view showing certain parts visible in FIGURE 1 to an enlarged scale and in greater detail, FIGURE 5 is a section taken on the line V—V of FIGURE 4, FIGURE 6 is a scrap plan view showing certain parts visible in FIGURE 1 to an enlarged scale and in greater detail, and FIGURE 7 is a section taken on the line VII—VII of FIGURE 6.

Referring to the drawings, the machine which is illustrated is a ram-type pick-up baler having a baling chamber 1, a feeding chamber 2 and a pick-up unit 3 located in front of the chamber 2 relative to the intended direction of travel of the implement which is indicated by the arrow A in FIGURE 1 of the drawings. The baler is supported on the ground by two wheels 5 mounted at opposite ends of a rotatable axle 4. A ram or plunger 6 is reciprocably housed in the baling chamber 1 and is linked by a connecting rod or pitman 7 to the crank pin of a rotatable crank shaft 8 located towards the leading end of the chamber 1. The teeth of a bevel pinion 9 secured to the crank shaft 8 mesh with those of a relatively smaller bevel pinion 10 secured to one end of a rotatable shaft 11 that extends parallel or substantially parallel to the longitudinal axis of the chamber 1. The free leading end 12 of the shaft 11 is provided with means (not shown), such as splines, to enable it to be placed in driven connection with the power take-off shaft of a tractor or other propelling and operating vehicle. A fly-wheel 13 is secured to the shaft 11 immediately to the rear of its leading end 12.

The pick-up unit 3 has a central rotatable shaft 16 to which a plurality of resilient tines 14 are connected. The tines 14 are arranged in groups and each group passes, during its rotation, through a corresponding slot in a sheath 15, the slots acting to strip hay or other crop from the tines 14 after being displaced thereby. The end of the central shaft 16 remote from the chamber 1 carries a pulley 17 which is in driven connection with a further pulley 19 by way of an endless rope, belt or the like 18. The pulley 19 is fastened to one end of a rotatable shaft 20 whose opposite end carries a further pulley 21 that is in driven communication with a pulley 23 by way of an endless rope, belt or the like 22. The pulley 23 is secured to one end of the crank shaft 8. A draw-bar 24 is adjustably connected to the leading end of the pick-up baler adjacent the shaft 11 and is adapted to be connected in known or other suitable manner to the tow-bar or hitch of a tractor or other propelling vehicle.

An arm 25 projects obliquely forwardly from the leading end of the ram or plunger 6 and is connected by a vertical pivot pin 26 to one end of a coupling rod 27. The opposite end of the coupling rod 27 carries a relatively perpendicular plate 28 (FIGURES 2 and 3) to which the housing 30 for a pair of ball bearings 32 is fastened by bolts 29. A pad 31 formed from rubber or like resilient material is sandwiched between the plate 28 and the housing 30. A pivotal shaft 34 that extends parallel to the pivot pin 26 is entered axially through the two ball bearings 32, a spacing sleeve 33 surrounding said shaft between the two ball bearings.

The shaft 34 is entered through holes formed in two horizontal strips 35 that are located above the uppermost, and below the lowermost, ball bearing 32 respectively, spacing washers 36 being placed around the shaft 34 between the strips 35 and the respective ball bearings 32. At its lowermost end, the shaft 34 is formed with a head 37 and the lowermost strip 35 is sandwiched between this head and a further spacing washer 36 which, in turn, is sandwiched between the strip 35 and the neighbouring ball bearing 32. Approximately half of the length of the pivotal shaft 34 projects above the uppermost strip 35 and is surrounded by a pair of ball bearings 38, a housing 39 and a spacing sleeve 41 constructed and arranged in substantially the same manner as the previously described parts 32, 30 and 33 respectively. A spacing washer 40 surrounds the shaft 34 between the uppermost strip 35 and the lowermost of the two ball bearings 38 and the various parts of the whole assembly are prevented from becoming axially displaced relative to one another by a shouldered cap 42 which is drawn into engagement with the inner race of the uppermosct ball bearing 38 by a bolt 43 whose shank is entered through a central hole in the cap 42 and screwed into a matching bore formed axially in the upper end of the pivotal shaft 34. The housing 39 is fastened to a plate mounted at one of a coupling rod 44 by bolts 45 in a similar manner to that previously described in connection with the parts 30, 28 and 27. A pad 46, similar to the previously described pad 31, is sandwiched between the housing 39 and the plate carried at the end of the coupling rod 44.

The ends of the two strips 35 remote from the pivotal shaft 34 are secured to a horizontal sleeve 47 (FIGURES 5 and 7) which sleeve, in turn, is fastened to the uppermost end of a vertical pivotal shaft 48. As can be seen in FIGURE 5 of the drawings, the shaft 48 is journalled in a vertical sleeve 50 by means of upper and lower ball bearings 49, a spacing sleeve 51 extending around the shaft between the inner races of the bearings 49 and a shouldered cap 52 that is drawn into engagement with the inner race of the lower ball bearing 49 by a bolt 53 whose shank is entered through a central hole in the cap 52 and screwed into a correspondingly screw-threaded bore formed axially of the shaft 48. The uppermost ball bearing 49 abuts against a thickened head of the shaft 48 to which the sleeve 47 is secured. The two strips 35 afford an arm which interconnects the coupling rod 27 and the sleeve 47. As can be seen in FIGURES 4, 5 and 7, two lugs 54 that are contained in relatively perpendicular planes project from the sleeve 50 that surrounds the shaft 48, one of them being fastened to a lug 56 projecting from a frame beam 55 by bolts 57 whilst the other bears against a lug 56 projecting from the same frame beam 55 and is fastened to the frame beam itself by further bolts 57 (see FIGURE 4).

A shaft 59 is rotatably journalled inside the sleeve 47 by a pair of ball bearings 58, a spacing sleeve 60 surrounding said shaft between the inner races of the two ball bearings. One end of the shaft 59 is formed with a collar or flange 61 to which a surrounding shouldered plate 62 is secured. Axial displacement of the shaft 59 relative to the sleeve 47 is prevented by a shouldered cap 63 that is drawn into engagement with the ball bearing 58 located at the end of the shaft 59 remote from the plate 62 by a bolt 64 whose shank is entered through a central hole in the cap 63 and screwed into a correspondingly screw-threaded bore formed axially of the shaft 59. A tubular arm 65 is co-axially fastened to the collar or flange 61 at the end of the shaft 59 and curved spring steel tines 66 (FIGURES 6 and 7) are mounted on the tubular arm 65. Neighbouring pairs of tines 66 are formed integrally from single lengths of spring steel wire or rod and their roots are interconnected by helices 67 that are wound around the arm 65. The two helices 67 corresponding to a single pair of tines 66 are wound in relatively opposite directions and are interconnected by an approximately 180° bend. This bend is secured to the arm 65 by a clamping plate 68 and a bolt 69 entered diametrically through holes in the tube 65.

As can be seen in FIGURE 7 of the drawings, the sleeve 47 carries a projecting strip 70 which, in the relative positions of the shaft 59 and sleeve 47 shown in FIGURE 7, is engaged by a lug 71 formed on the plate 62 that is rigid with the shaft 59. It will be noted that, in this relative position, the curved tines 66 project generally downwardly and that said tines, together with the arm 65 and shaft 59, can only be turned out of said relative position in the direction indicated by the arrow B in FIGURE 7.

The end of the coupling rod 44 remote from the pivotal shaft 34 is connected to one end of a further coupling rod 72 (FIGURE 1) by a vertical pivotal shaft 73. The shaft 73 is constructed and arranged to interconnect the coupling rods 44 and 72 in substantially the same way as the pivotal shaft 34 interconnects the coupling rods 27 and 44 except that, in this case, there are no parts corresponding to the strips 35. The end of the coupling rod 72 remote from the pivotal shaft 73 carries a vertical sleeve 74 that is arranged so as to be turnable about a vertical shaft 75 rigidly secured to the upper casing 76 of the feeding chamber 2. A shaft similar to the shaft 59 is turnably journalled in a horizontal sleeve, similar to the sleeve 47, and secured to the vertical sleeve 74. A tubular arm 78, similar to the previously described arm 65, is co-axially secured to the shaft that has just been mentioned and has a number of curved tines 66 secured to it in a similar manner to that previously described with reference to FIGURES 6 and 7. Once again, the tubular arm 78 can turn, together with its resilient curved tines 66, out of a position in which said tines project generally downwardly, only in the direction indicated by the arrow C in FIGURE 1 of the drawings, turning movements in a relatively opposite direction being blocked by parts similar to the previously described parts 70 and 71 that can be seen in FIGURE 7.

In the use of the pick-up baler which has been described, the leading end of the draw-bar 24 is connected to the tow-bar or hitch of a tractor or other propelling vehicle whilst the shaft 11 is placed in driven connection with the power take-off shaft of the same vehicle by an intermediate transmission shaft (not shown) having universal joints at its opposite ends. Upon rotation of the shaft 11, the ram or plunger 6 will reciprocate in the baling chamber 1 and force compressed hay or other crop from the feeding chamber 2 rearwardly along the baling chamber 1 in the direction indicated by the arrow D in FIGURE 1. As the baler moves over the ground in the direction A, the tines 14 of the pick-up unit 3 collect the hay or other crop lying on the ground and deliver it rearwardly into the feeding chamber 2.

During a movement of the ram or plunger 6 in the direction D, the tubular arm 65 will be turned about the shaft 48 in the direction indicated by the arrow E in FIGURE 1. It will be noted that this direction is relatively opposite to the direction B indicated in FIGURE 7 so that the tubular arm 65 and its tines 66 can also turn about the shaft 59 as soon as the tines 66 meet any crop contained in the chamber 2 whereafter said tines slide horizontally or approximately horizontally over the top of such crop. At the same time as the tubular arm 65 is performing the movement which has just been described, the tubular arm 78 will be turned about the shaft 75 in the direction indicated by the arrow C in FIGURE 1. Its tines 66 thus displace hay or other crop which they engage in the same direction in the feeding chamber 2 until such crop reaches the area of that chamber subjected to the action of the tines 66 carried by the tubular arm 65. It will be apparent from FIGURE 1 that, when the arm 65 reaches its foremost position with respect to the direction A, it is located above a rearmost region of the pick-up unit 3.

As soon as the ram or plunger 6 starts to move in a direction opposite to the direction D, the arm 65 turns about the shaft 48 in a direction opposite to the direction E. In this case, its tines 66 rapidly reach the positions shown in FIGURE 7 and maintain these positions by virtue of the co-operation between the strip 70 and lug 71. Hay or other crop which the tines 66 contact is thus swept round into the path of the ram of or plunger 6 which, by the time the crop reaches the chamber 1, is at, or adjacent, the end of its stroke closest to the shaft 11. It will be apparent that, concurrently, the arm 78 is turned back about the shaft 75 in a direction opposite to the direction C, its tines 66 turning upwardly into horizontal or substantially horizontal positions so that they slide over any hay or other crop which they encounter.

The regions which are swept by the tines 66 of the two tubular arms 65 and 78 are shown in broken lines in FIGURE 1 of the drawings and it will be apparent from the preceding description that hay or other crop is uniformly supplied from the feeding chamber 2 to the baling chamber 1. Substantial lateral forces act upon the ram or plunger 6 as a result of the arrangement which has been described and accordingly, the baling chamber 1 is provided with conventional guide members 6A adapted to prevent undesired lateral displacement of the ram or plunger 6. The width of the pick-up unit 3 may be great enough to enable relatively broad swaths of cut hay or other crop to be dealt with during a single traverse. Nevertheless, the tubular arms 65 and 78 are comparatively short and of relatively light weight. This keeps the mass of these parts, which have to be reciprocated by drive derived from the power take-off shaft of the propelling tractor or other vehicle, to a minimum and also enables the feeding chamber 2 to be of a compact construction. The rubber or other resilient pads 31 and 46 which are provided at the opposite ends of the coupling rods 27, 44 and 72 cushion the moving parts against mechanical shocks which might otherwise cause damage. The curved shape of the various tines 66 enables them to lift the hay or other crop away from the floor of the chamber 2 and their resilient construction allows them to deflect to a limited extent when required under the action of forces which might permanently bend rigid tines.

The position of the coupling rod 27 at an instant at which the ram or plunger 6 is at the end of its stroke furthest from the shaft 11 is shown in broken lines in FIGURE 1 and it will be evident that, in this position, the coupling rod 27 has passed the point at which it extends perpendicular to the direction D. This ensures that, at the end of a movement of the ram or plunger 6 in the direction D, the arm 65 is turned through a relatively few degrees in a direction opposite to the direction E. During a return stroke of the ram or plunger 6 in a direction opposite to the direction D, the arm 65 first turns through the few degrees in the direction E before turning back in the relatively opposite direction through the arc shown in broken lines in FIGURE 1. It will be evident that the arm 78 will act in a similar manner. This small reciprocation of the two arms 65 and 78 enhances the tendency for the tines 66 to return to positions similar to those illustrated in FIGURE 7 and also tends to shed hay or other crop adhering to the tines.

What I claim is:

1. A feeding device for a baling machine, having a feeding chamber, a system of articulated and pivotable interconnected coupling rods, one end of said system being pivotably connected to a reciprocating baling plunger in a baling chamber, two feed arms in said feeding chamber, each of said arms being pivotably linked to said system about a fixed substantially vertical axis, said arms being spaced from each other and being pivotably connected to each other by said coupling rods, said coupling rods being actuated by said plunger to swing said arms and said arms having crop-engaging means for moving crop material into said baling chamber.

2. The device of claim 1, wherein a first feed arm is located adjacent an entrance to the baling chamber and the second feed arm is located at a greater distance outwardly of the baling chamber.

3. The device of claim 2, wherein the second feed arm has a free end which swings to move crop into the path of said first feed arm.

4. The device of claim 1, wherein the crop engaging means are resilient tines mounted on the feed arms.

5. The device of claim 1, wherein one end of each feed arm is pivoted approximately ninety degrees about a substantially vertical axis during its rotation in one direction.

6. The device of claim 1, wherein a first feed arm has one of its ends pivotably connected to fixed pivot means, the other end of said first feed arm being free to swing in said feeding chamber.

7. The device of claim 6, wherein strip means interconnects said first mentioned end of said feed arm to a further pivot in said system.

8. The device of claim 6, wherein said first feed arm is swung adjacent the plunger during reciprocation thereof and a second feed arm is swung to a position away from the path of movement of said first feed arm.

9. The device of claim 8, wherein each arm is swung in a reverse direction for several degrees at the end of each compression movement of the plunger.

10. A feeding device for a baling machine, having a feeding chamber comprising two feed arms, each of said feed arms being pivotal about a fixed substantially vertical axis, a link drive being provided between one of said feed arms and a reciprocating baling plunger in a baling chamber, further link means being provided for pivotably interconnecting said feed arms, each of said arms having crop-engaging members for moving crop material in said feeding chamber, whereby reciprocation of said plunger actuates said feed arms to swing about their respective vertical axes, one of said feed arms moving crop into the path of the other feed arm.

11. A feeding device for a baling machine having a feeding chamber, a first coupling rod, one end of which is pivotably connected to a reciprocating baling plunger, the other end of said first coupling rod being pivotably connected to a first end of a laterally extending second coupling arm, a first feed arm in said chamber connected at a fixed horizontal angle to the other end of said second coupling arm, the second coupling arm and said first feed arm being pivotably mounted on the baling machine to jointly pivot about a substantially vertical axis, a third coupling rod having one end connected to said first end of said second coupling rod, a second feed arm in said chamber pivotably connected at one end to the other end of said third coupling rod and pivotably connected to the baling machine intermediate its length to pivot about a substantially vertical axis, said feed arms having crop-engaging means whereby reciprocation of said plunger actuates said coupling rods to pivot and swing said arms about their respective vertical axes, the second feed arm moving crop into the path of said first feed arm.

12. The device of claim 11, wherein the other end of the first coupling rod and the first end of the second coupling rod are yieldingly connected.

13. The device of claim 11, wherein the baling plunger reciprocates in a compression chamber and the first coupling rod is connected to the reciprocating plunger approximately mid-way between the sides of said compression chamber.

References Cited by the Examiner

UNITED STATES PATENTS

| | | | |
|---|---|---|---|
| 2,499,615 | 3/1950 | Tuft | 100—189 X |
| 2,608,929 | 9/1952 | Paradise et al. | 100—143 X |
| 2,720,073 | 10/1955 | Freeman et al. | 56—341 |
| 2,885,953 | 5/1959 | Miller | 100—142 |
| 3,103,775 | 9/1963 | Evans et al. | 100—142 X |
| 3,106,814 | 10/1963 | Roy | 100—189 X |
| 3,156,346 | 11/1964 | McDuffie | 100—142 X |

FOREIGN PATENTS 1,291,028   3/1962   France.

LOUIS O. MAASSEL, *Primary Examiner.*